US010754315B2

(12) United States Patent
Sato et al.

(10) Patent No.: US 10,754,315 B2
(45) Date of Patent: Aug. 25, 2020

(54) MANAGEMENT SYSTEM AND MANAGEMENT METHOD FOR TRANSMITTING A COMMAND INCLUDING A CODE VALUE FOR CONTROLLING AN APPARATUS

(71) Applicant: KYOCERA Corporation, Kyoto-shi, Kyoto (JP)

(72) Inventors: Yuri Sato, Kawasaki (JP); Kazutaka Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 99 days.

(21) Appl. No.: 16/079,553

(22) PCT Filed: Feb. 24, 2016

(86) PCT No.: PCT/JP2016/055448
§ 371 (c)(1),
(2) Date: Aug. 23, 2018

(87) PCT Pub. No.: WO2017/145287
PCT Pub. Date: Aug. 31, 2017

(65) Prior Publication Data
US 2019/0049907 A1 Feb. 14, 2019

(51) Int. Cl.
*G05B 15/02* (2006.01)
*G06F 8/60* (2018.01)
*H04L 12/28* (2006.01)

(52) U.S. Cl.
CPC .............. *G05B 15/02* (2013.01); *G06F 8/60* (2013.01); *H04L 12/2803* (2013.01)

(58) Field of Classification Search
CPC ........ H04L 12/2803; G06F 8/60; G05B 15/02
See application file for complete search history.

(56) References Cited

U.S. PATENT DOCUMENTS

| 5,179,703 A | 1/1993 | Evans |
| 6,301,611 B1 | 10/2001 | Matsumoto et al. |
| 6,715,015 B1 * | 3/2004 | Ki .................... H04L 12/40071 348/14.04 |
| 8,676,233 B2 * | 3/2014 | Fischer ................. G01S 5/0009 340/988 |

(Continued)

FOREIGN PATENT DOCUMENTS

| DE | 10328917 A1 | 1/2005 |
| GB | 2419064 A | 4/2006 |

(Continued)

OTHER PUBLICATIONS

Hiroshi Sugimura et al., Jibun de Tsukuro! Smart House ECHONET Lite Nyumon, Jul. 5, 2015, pp. 81-87, fig.2, OHM vol. 102, No. 7, 18pp.

*Primary Examiner* — Vincent H Tran
(74) *Attorney, Agent, or Firm* — Hauptman Ham, LLP

(57) ABSTRACT

A management system comprising an apparatus and a control device, wherein the control device comprises a transmitter configured to transmit, to the apparatus, a command controlling the apparatus, the command includes version information indicating a version corresponding to the control device, and the version defines an information element included in the command.

14 Claims, 6 Drawing Sheets

(56) References Cited

U.S. PATENT DOCUMENTS

| | | | | |
|---|---|---|---|---|
| 2001/0032277 A1* | 10/2001 | Igarashi | ............ | H04L 12/40052 |
| | | | | 710/19 |
| 2002/0191637 A1* | 12/2002 | Lee | .......................... | G06F 8/65 |
| | | | | 370/465 |
| 2003/0012155 A1 | 1/2003 | Sayeedi | | |
| 2005/0086560 A1* | 4/2005 | Okeda | ................... | G06F 11/004 |
| | | | | 714/11 |
| 2012/0166655 A1* | 6/2012 | Maddali | .................. | G06F 9/547 |
| | | | | 709/228 |
| 2015/0055585 A1* | 2/2015 | Huang | .................. | H04W 72/00 |
| | | | | 370/329 |
| 2015/0111554 A1* | 4/2015 | Tooyama | .............. | H04W 24/02 |
| | | | | 455/418 |
| 2015/0214745 A1* | 7/2015 | Yoon | ....................... | H02J 50/10 |
| | | | | 307/104 |

FOREIGN PATENT DOCUMENTS

| | | |
|---|---|---|
| JP | H1-161563 A | 6/1989 |
| JP | H9-274605 A | 10/1997 |
| JP | 2005-529502 A | 9/2005 |
| JP | 2006-338232 A | 12/2006 |
| JP | 2010-128512 A | 6/2010 |
| JP | 2010-128810 A | 6/2010 |
| JP | 2015-2362 A | 1/2015 |
| JP | 2015-531224 A | 10/2015 |
| WO | 2005/032203 A1 | 4/2005 |

\* cited by examiner

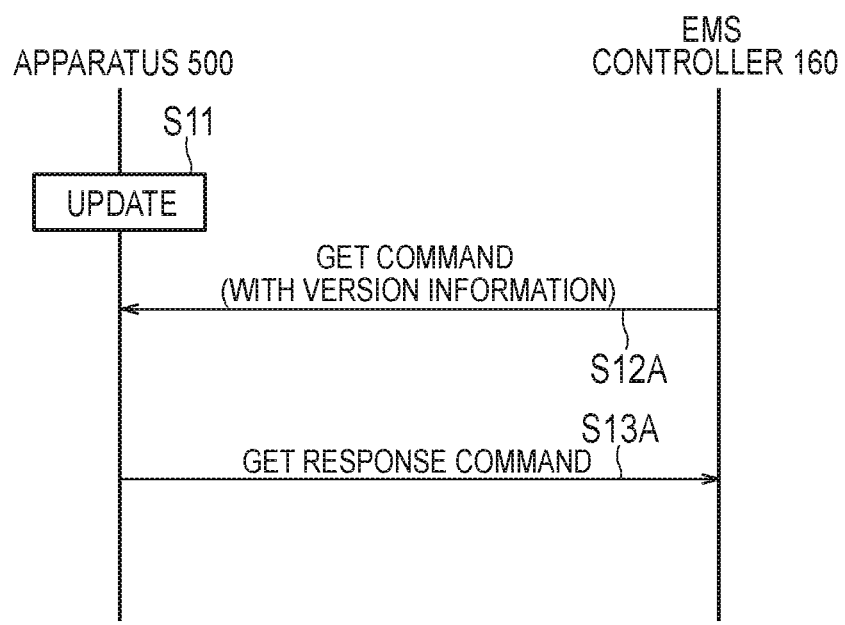
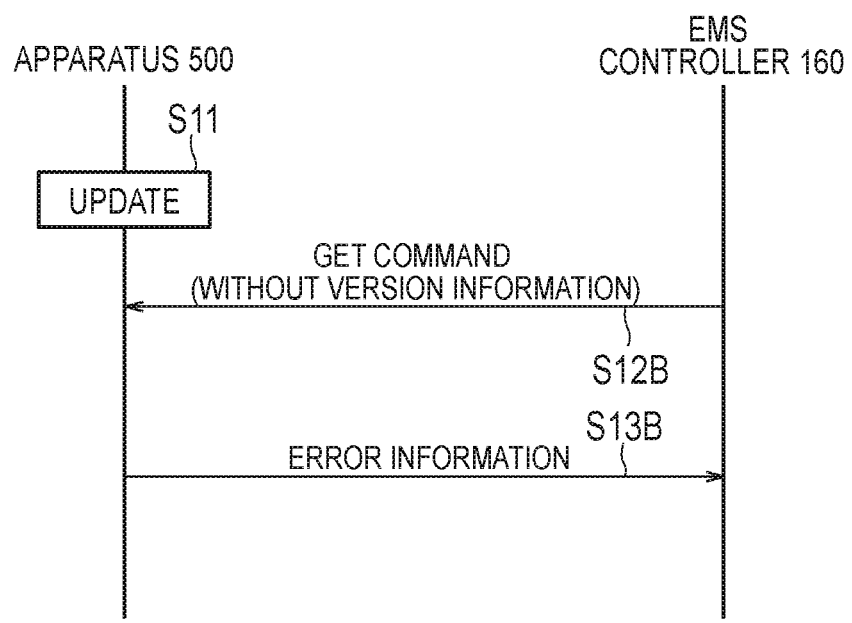

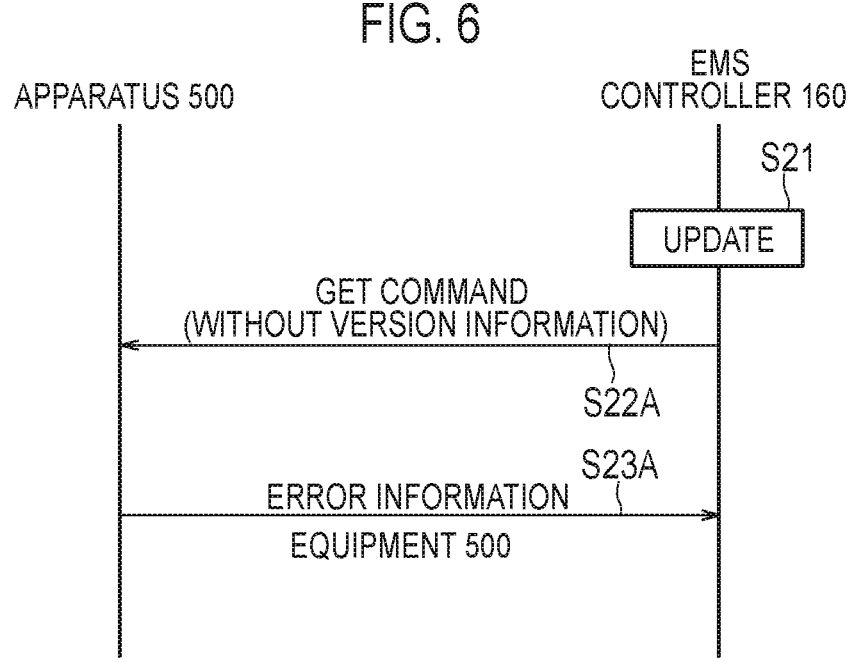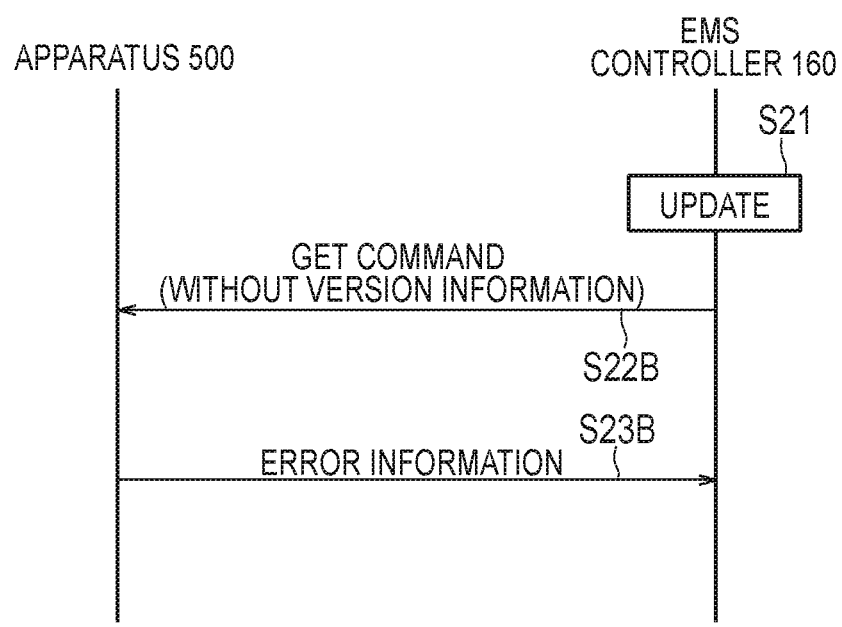

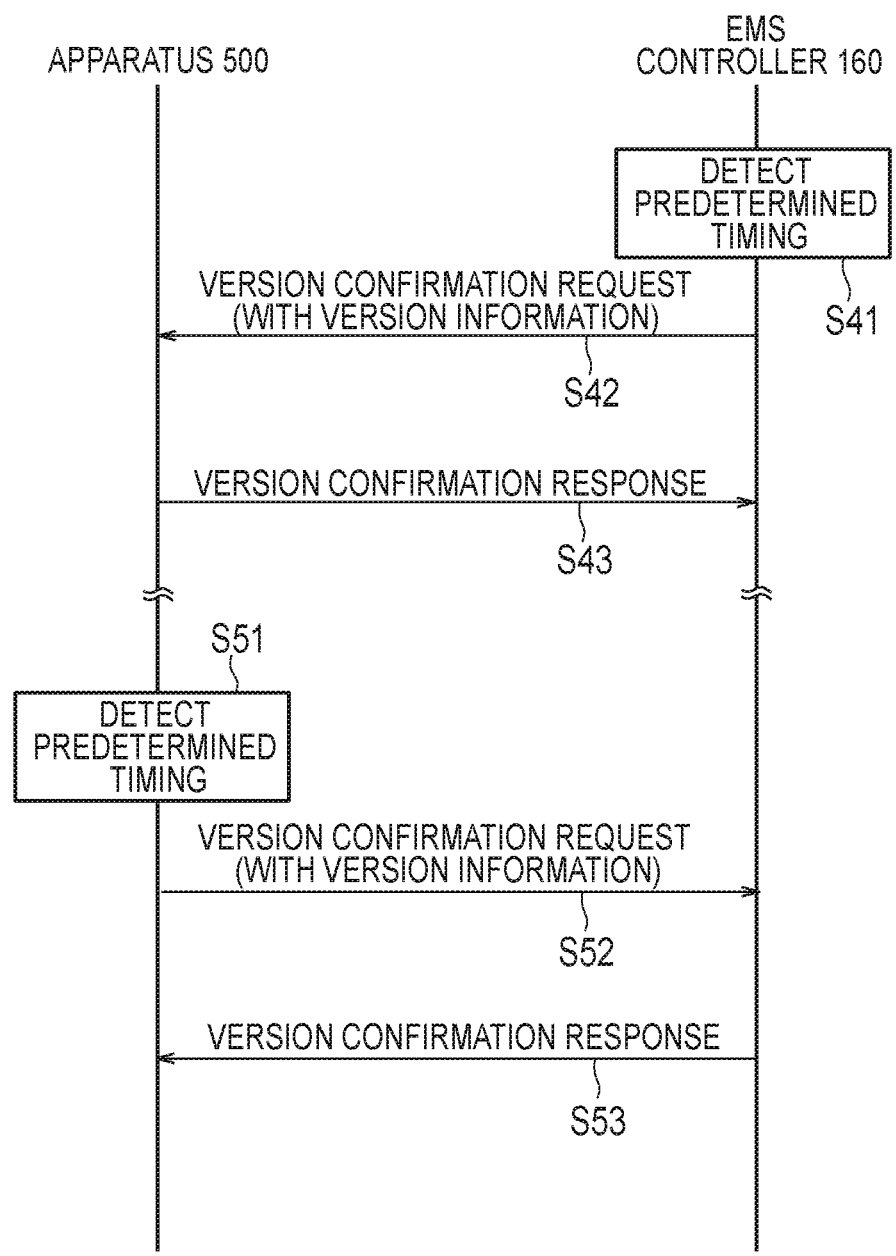

MANAGEMENT SYSTEM AND MANAGEMENT METHOD FOR TRANSMITTING A COMMAND INCLUDING A CODE VALUE FOR CONTROLLING AN APPARATUS

RELATED APPLICATIONS

The present application is a National Phase of PCT/JP2016/055448, filed Feb. 24, 2016.

TECHNICAL FIELD

The present invention relates to a management system including a plurality of apparatuses and a control device, a management method by which a control device manages a plurality of apparatuses, an apparatus provided in the management system, and a control device provided in the management system.

BACKGROUND ART

Recently, a management system including a plurality of apparatuses and a control device for controlling the plurality of apparatuses has been proposed (for example, Patent Literature 1). The plurality of apparatuses are, for example, household electrical apparatuses such as air conditioner or lighting devices, distributed power supplies such as solar cells, storage batteries, or fuel power generators, and the like. The control device is referred to as, for example, a home energy management system (HEMS), a store energy management system (SEMS), a building energy management system (BEMS), a factory energy management system (FEMS), or a cluster/community energy management system (CEMS).

In order to spread the above-described management system, it is effective to share the communication standards between the plurality of apparatus and the control device, and attempts have been made to standardize such communication standards.

One of the problems is to improve user convenience in the common communication standard between the plurality of apparatus and the control device.

CITATION LIST

Patent Literature

Patent Literature 1: JP 2010-128810 A

SUMMARY

One aspect is abstracted as a management system comprising an apparatus and a control device, wherein the control device comprises a transmitter configured to transmit, to the apparatus, a command controlling the apparatus, the command includes version information indicating a version corresponding to the control device, and the version defines an information element included in the command.

One aspect is abstracted as a management system comprising an apparatus and a control device, wherein the control device comprises a controller configured to confirm, with respect to the apparatus at a first timing, whether the device is compatible with a version corresponding to the control device, the apparatus comprises a controller configured to confirm, with respect to the control device at a second timing, whether the control device is compatible with a version corresponding to the apparatus, and the version defines an information element included in the command.

One aspect is abstracted as a management method comprising: transmitting a command for controlling an apparatus, from a control device to the apparatus, wherein the command includes version information indicating a version corresponding to the control device, and the version defines an information element included in the command.

BRIEF DESCRIPTION OF DRAWINGS

FIG. 4 is a diagram illustrating a management method according to an embodiment.

FIG. 5 is a diagram illustrating a management method according to an embodiment.

FIG. 6 is a diagram illustrating a management method according to an embodiment.

FIG. 7 is a diagram illustrating a management method according to an embodiment.

FIG. 9 is a diagram illustrating a management method according to another embodiment.

DESCRIPTION OF EMBODIMENTS

Figure 1:
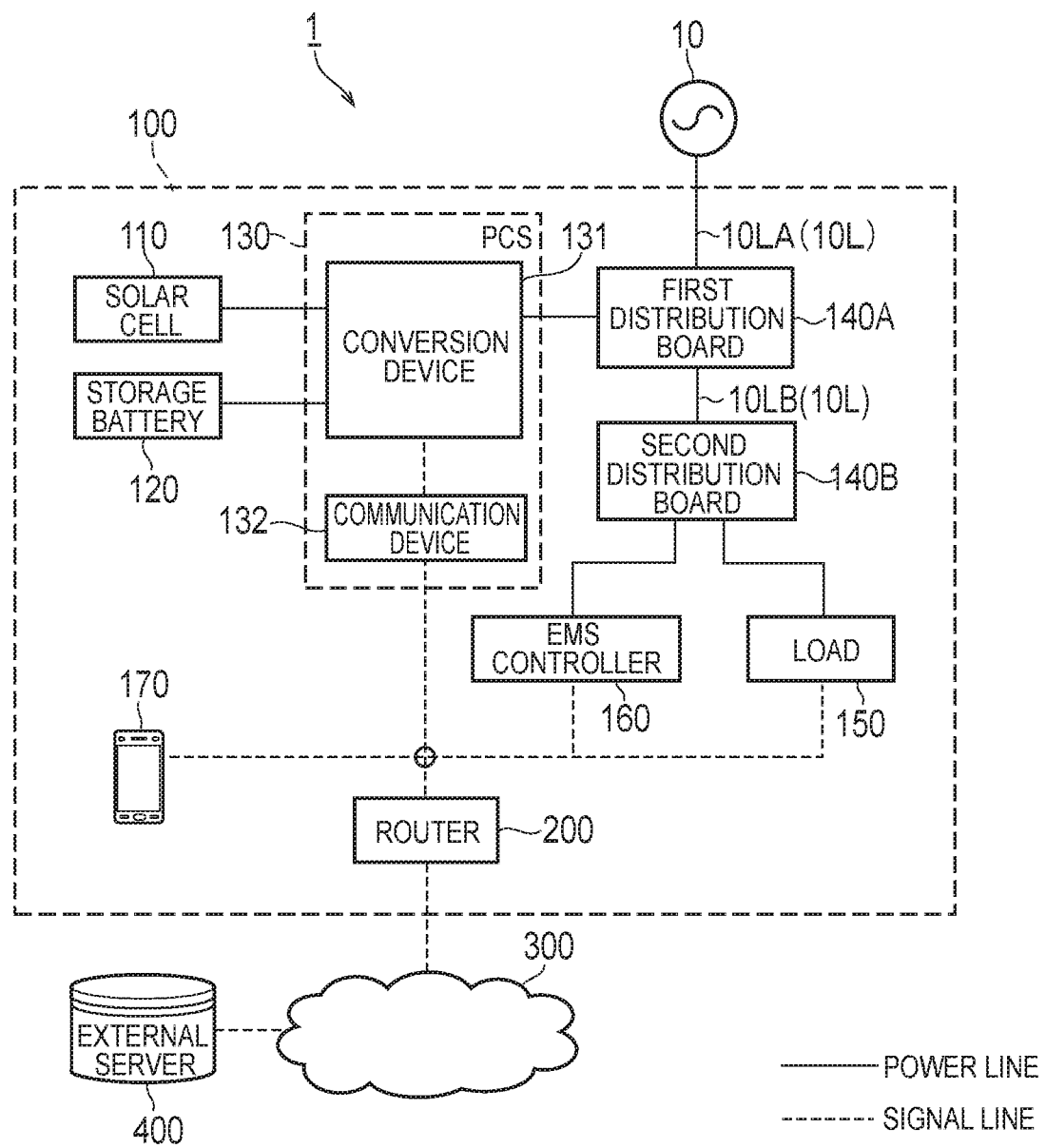
FIG. 1 is a diagram illustrating a power management system 1 according to an embodiment.

Hereinafter, an embodiment will be described with reference to the drawings. In the following description of the drawings, the same or similar reference numerals are assigned to the same or similar parts.

However, it should be noted that the drawings are schematic and ratios of dimensions and the like may be different from actual ones. Therefore, concrete dimensions and the like should be determined with reference to the following explanation. In addition, the drawings may include portions having different dimensional relationships or ratios.

Embodiment (Power Management System)

Hereinafter, a power management system according to an embodiment will be described.

As illustrated in FIG. 1, the power management system 1 includes a customer facility 100 and an external server 400. The customer facility 100 includes a router 200. The router 200 is connected to the external server 400 via a network 300. The router 200 constitutes a local area network and is connected to, for example, a PCS 130, a load 150, an EMS controller 160, an operation terminal 170, and the like. In FIG. 1, a solid line indicates a power line, and a dashed line indicates a signal line. It should be noted that the present invention is not limited thereto, and a signal may be transmitted through a power line.

The customer facility 100 includes a solar cell 110, a storage battery 120, the PCS 130, a distribution board 140, the load 150, the EMS controller 160, and the operation terminal 170.

The solar cell 110 is an apparatus that generates power in response to light reception. The solar cell 110 outputs the generated direct current power (hereinafter referred to as DC power). The power generation amount of the solar cell 110 varies according to the amount of solar radiation applied to the solar cell 110.

The storage battery 120 is an apparatus that accumulates power. The storage battery 120 outputs the accumulated DC power.

The PCS 130 is an example of a power conditioning system (PCS) that converts DC power into alternating current power (hereinafter referred to as AC power). In the embodiment, the PCS 130 includes a conversion device 131 and a communication device 132.

The conversion device 131 converts DC power input from the solar cell 110 into AC power and converts DC power input from the storage battery 120 into AC power. The conversion device 131 converts AC power supplied from a power grid 10 into DC power. The communication device 132 is connected to the conversion device 131, receives various messages to the conversion device 131, and transmits various messages from the conversion device 131. In the communication between the communication device 132 and the conversion device 131, a protocol not conforming to a predetermined protocol to be described later (for example, a proprietary protocol) may be used.

In the embodiment, the conversion device 131 is connected to a main power line 10L (here, a main power line 10LA and a main power line 10LB) connected to the power grid 10 via a first distribution board 140A, and is connected to both the solar cell 110 and the storage battery 120. The main power line 10LA is a power line that connects the power grid 10 and the first distribution board 140A, and the main power line 10LB is a power line that connects the first distribution board 140A and the second distribution board 140B.

The distribution board 140 is connected to the main power line 10L. The distribution board 140 includes the first distribution board 140A and the second distribution board 140B. The first distribution board 140A is connected to the power grid 10 via the main power line 10LA and is also connected to the solar cell 110 and the storage battery 120 via the conversion device 131. In addition, the first distribution board 140A controls the power output from the conversion device 131 and the power supplied from the power grid 10 to flow through the main power line 10LB. The power flowing from the main power line 10LB is distributed to each apparatus (here, the load 150) by the second distribution board 140B.

The load 150 is an apparatus that consumes the power supplied via the power line. For example, the load 150 includes apparatuses such as a refrigerator, a lighting, an air conditioner, a television, and the like. The load 150 may be a single apparatus or a plurality of apparatuses.

The EMS controller 160 is an energy management system (EMS) that controls each apparatus (for example, the solar cell 110, the storage battery 120, the PCS 130, or the load 150). Specifically, the EMS controller 160 is connected to each apparatus via the router 200 and performs communication of a predetermined message conforming to a predetermined protocol with each apparatus.

In the embodiment, the predetermined protocol is not particularly limited, and for example, may be ECHONET Lite, SEP 2.0, KNX, or the like. A predetermined format is, for example, a format conforming to ECHONET Lite. The predetermined message is, for example, a SET command, a GET command, a response command to the SET command, a response command to the GET command, or an INF command. The SET command is a message for instructing setting or operation on an apparatus. The GET command is a message for acquiring the state of the apparatus. The response command to the SET command is a message indicating that setting or operation instructed by the SET command has been received. The response command to the GET command is a message including the information requested by the GET command. The INF command is a message for notifying the state of the PCS 130.

The operation terminal 170 is a terminal that remotely operates each apparatus (for example, the solar cell 110, the storage battery 120, the PCS 130, or the load 150) by transmitting an access request to the EMS controller 160. A protocol (for example, a proprietary protocol) not conforming to a predetermined protocol may be used for communication between the operation terminal 170 and the EMS controller 160. The operation terminal 170 is, for example, a smartphone, a tablet, or a dedicated terminal. The operation terminal 170 is connected to the EMS controller 160 by wire or by wireless and communicates with the EMS controller 160. The operation terminal 170 may perform communication of a predetermined message having a predetermined format with the EMS controller 160.

The external server 400 is a server managed by a power company or a power aggregator. The external server 400 transmits a power command message to the PCS 130 or the EMS controller 160.

The power command message is a message relating to the suppression of the forward power flow amount that is the amount of power supplied from the power grid 10 or the reverse power flow amount that is the amount of power supplied to the power grid 10. The power command message relating to the reduction of the forward power flow amount may be, for example, a message to the effect that a requested amount of reduction of the power consumption amount is ○% reduction, a message to the effect that a requested amount of reduction of the power consumption amount is ○ kwh reduction, or a message to the effect that incentives are presented according to the reduction amount. For the message relating to the suppression of the reverse power flow, for example, a message to the effect that the reverse power flow is reduced by ○% is assumed.

(Control Device)

Figure 2:
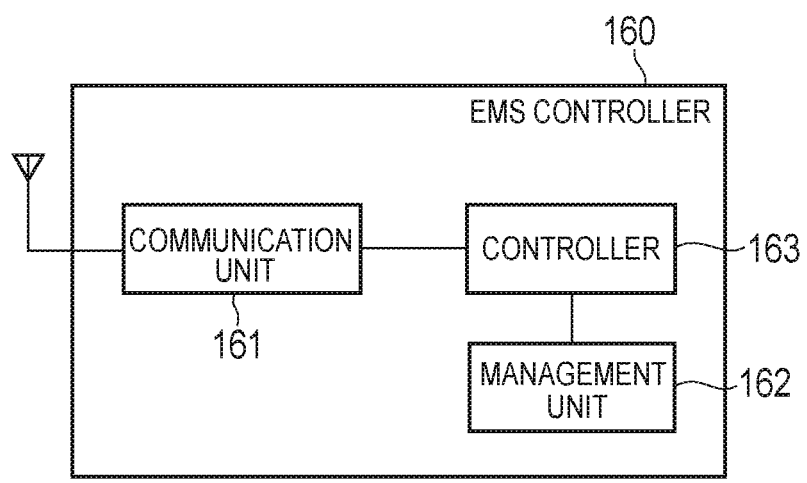
FIG. 2 is a diagram illustrating an EMS controller 160 according to an embodiment.

Hereinafter, a control device according to an embodiment will be described. As illustrated in FIG. 2, the EMS controller 160 includes a communication unit 161, a management unit 162, and a controller 163.

The communication unit 161 includes a communication module and communicates with each apparatus (for example, the solar cell 110, the storage battery 120, the PCS 130, or the load 150). The communication unit 161 communicates with the operation terminal 170 and the external server 400.

In the embodiment, the communication unit 161 receives a command for controlling the apparatus with respect to the apparatus. The command includes version information indicating a version corresponding to the EMS controller 160. The version defines an information element included in the command.

For example, when the ECHONET Lite method is taken as an example, the version corresponds to Release of Appendix that defines an information element included in the command That is, it should be noted that the version according to the embodiment does not mean the versions of the communication standard and the firmware of the EMS controller and each apparatus. However, when the definition of the information element included in the command also changes as the versions of the communication standard and the firmware are changed, it may be considered that the version according to the embodiment is the versions of the communication standard and the firmware. When the version does not include the versions of the communication standard and the firmware, the communication unit 161 may transmit at least one of the communication standard and the firmware together with the version information.

The command is, for example, the above-mentioned SET command or GET command, and includes a code value associated with the contents of the command. When the version defining the command is changed (updated), the meaning of the code value, that is, the contents of the command may be changed even if the code value is the same. That is, the meaning of the code value (the contents of the command) may be different for each version. The version is information for uniquely specifying the meaning of the code value included in the command Here, if the version defining the command is specified, the meaning of the code value can be uniquely specified.

The management unit 162 includes a volatile or nonvolatile memory, or a disk drive such as hard disk drive (HDD) or solid state drive (SSD), and manages various kinds of information. Even when the version corresponding to the EMS controller 160 is updated from a first version to a second version, the management unit 162 manages the command defined by the second version and continues to manage the command defined by the first version, that is, the old version older than the second version.

The controller 163 includes a central processing unit (CPU) and a memory and controls the EMS controller 160. Upon transmission of the command, the controller 163 instructs the communication unit 161 to transmit the command including the version information indicating the version corresponding to the EMS controller 160.

Here, after the version corresponding to the EMS controller 160 has been updated to the second version, if the version corresponding to the apparatus remains in the first version, the controller 163 may control the communication unit 161 to transmit the command defined by the first version to the apparatus.

(Apparatus)

Figure 3:
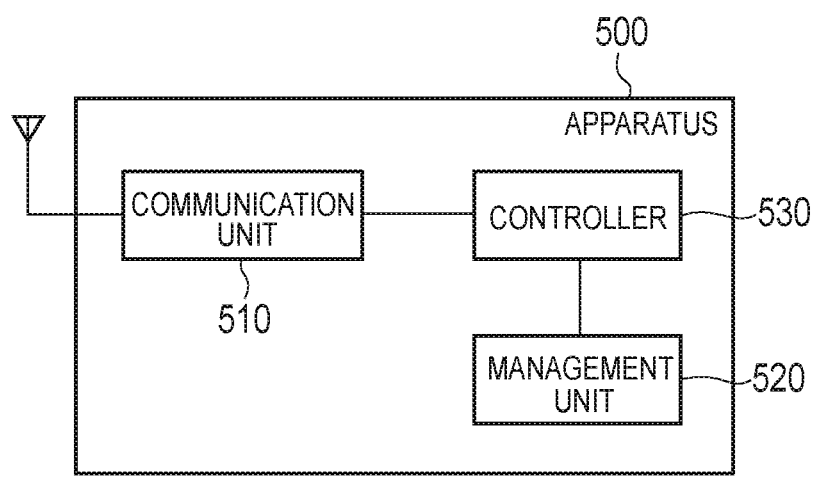
FIG. 3 is a diagram illustrating an apparatus 500 according to an embodiment.

Hereinafter, an apparatus according to an embodiment will be described. The apparatus 500 may be any apparatus that is controlled by the EMS controller 160, and is the solar cell 110, the storage battery 120, the PCS 130, or the load 150. As illustrated in FIG. 3, the apparatus 500 includes a communication unit 510, a management unit 520, and a controller 530.

The communication unit 510 includes a communication module and communicates with the EMS controller 160.

The communication unit 510 receives a command for controlling the apparatus 500 from the EMS controller 160. The command includes version information indicating a version corresponding to the EMS controller 160. The version defines an information element included in the command as described above.

The management unit 520 includes a volatile or nonvolatile memory, or a disk drive such as HDD or SSD, and manages various kinds of information. Even when the version corresponding to the apparatus 500 is updated from a first version to a second version, the management unit 162 manages the command defined by the second version and continues to manage the command defined by the first version.

The controller 530 includes a CPU and a memory and controls the apparatus 500. The controller 530 specifies the version corresponding to the EMS controller 160 based on the version information included in the command and determines the meaning of the code value included in the command based on the specified version.

For example, if the version corresponding to the EMS controller 160 is the first version, the controller 530 determines the meaning of the code value included in the command based on the first version. On the other hand, if the version corresponding to the EMS controller 160 is the second version, the controller 530 determines the meaning of the code value included in the command based on the second version.

If the version information of the EMS controller 160 is not included in the command, the controller 530 may control the communication unit 510 to transmit error information to the EMS controller 160 without executing the command.

If the version corresponding to the EMS controller 160 is the same as the version corresponding to the apparatus 500, the controller 530 executes the command received from the EMS controller 160. If the version corresponding to the EMS controller 160 is different from the version corresponding to the apparatus 500, the controller 530 may not execute the command. The controller 530 may not execute the command if the version corresponding to the EMS controller 160 is different from the version corresponding to the apparatus 500 and the contents of the command in the version corresponding to the EMS controller 160 are different from the contents of the command in the version corresponding to the apparatus 500. The controller 530 may execute the command if the version corresponding to the EMS controller 160 is different from the version corresponding to the apparatus 500 but the contents of the command in the version corresponding to the EMS controller 160 is the same as the contents of the command in the version corresponding to the apparatus 500. In these cases, if the command is not executed, the controller 530 may control the communication unit 510 to transmit the error information to the EMS controller 160.

If the command is not defined as an object to be processed by the apparatus 500 in the version corresponding to the apparatus 500, the controller 530 may control the communication unit 510 to transmit the error information to the EMS controller 160. The case where the command is not defined as an object to be processed by the apparatus 500 in the version corresponding to the apparatus 500 is a case where a new command corresponding to a new version of the EMS controller 160 is not defined in the version corresponding to the apparatus 500, or a case where a command defined as an optional command in the version corresponding to the apparatus 500 is changed to a command essential in the corresponding new version of the EMS controller 160 and the apparatus 500 does not have the function of processing an optional command.

(Management Method)

Hereinafter, a management method according to an embodiment will be described. In FIGS. 4 to 7, the GET command is exemplified as the command for controlling the apparatus 500. In the initial state of FIGS. 4 to 7, both the version corresponding to the EMS controller 160 and the version corresponding to the apparatus 500 are the first version.

First, a case where the version information of the EMS controller 160 is included in the GET command and the version corresponding to the apparatus 500 is updated will be described.

As illustrated in FIG. 4, in step S11, the version corresponding to the apparatus 500 is updated from the first version to the second version. The apparatus 500 manages the command defined by the second version and continues to manage the command defined by the first version (for example, another version such as the old version).

In step S12A, the EMS controller 160 transmits, to the apparatus 500, the GET command including the version information of the EMS controller 160.

In step S13A, the apparatus 500 determines the meaning of the code value (the contents of the GET command) included in the GET command based on the first version and transmits a GET response command to the EMS controller 160.

Second, a case where the version information of the EMS controller 160 is not included in the GET command and the version corresponding to the apparatus 500 is updated will be described.

As illustrated in FIG. 5, in step S11, the version corresponding to the apparatus 500 is updated from the first version to the second version. The apparatus 500 manages the command defined by the second version and continues to manage the command defined by the first version.

In step S12B, the EMS controller 160 transmits, to the apparatus 500, the GET command without the version information of the EMS controller 160.

In step S13B, since the version information of the EMS controller 160 is not included in the GET command, the apparatus 500 cannot determine in which version the GET command is defined. Therefore, the apparatus 500 does not execute the command, that is, does not transmit the GET response command The apparatus 500 may transmit error information to the EMS controller 160.

Third, a case where the version information of the EMS controller 160 is included in the GET command and the version corresponding to the EMS controller 160 is updated will be described.

As illustrated in FIG. 6, in step S21, the version corresponding to the EMS controller 160 is updated from the first version to the second version. The EMS controller 160 may manage the command defined by the second version and continue to manage the command defined by the first version.

In step S22A, the EMS controller 160 transmits, to the apparatus 500, the GET command including the version information (second version) of the EMS controller 160.

In step S23A, since the version corresponding to the EMS controller 160 is different from the version corresponding to the apparatus 500, the apparatus 500 does not execute the command (does not transmit the GET response command) The apparatus 500 may transmit error information to the EMS controller 160.

Fourth, a case where the version information of the EMS controller 160 is included in the GET command and the version corresponding to the EMS controller 160 is updated will be described.

As illustrated in FIG. 7, in step S21, the version corresponding to the EMS controller 160 is updated from the first version to the second version. The EMS controller 160 may manage the command defined by the second version and continue to manage the command defined by the first version.

In step S22B, the EMS controller 160 transmits, to the apparatus 500, the GET command without the version information of the EMS controller 160.

In step S23B, since the version information of the EMS controller 160 is not included in the GET command, the apparatus 500 cannot determine in which version the GET command is defined. Therefore, the apparatus 500 does not execute the command. The apparatus 500 may transmit error information to the EMS controller 160.

In the cases illustrated in FIGS. 4 to 7, as described above, the apparatus 500 may not execute the command if the version corresponding to the EMS controller 160 is different from the version corresponding to the apparatus 500 and the contents of the command in the version corresponding to the EMS controller 160 is different from the contents of the command in the version corresponding to the apparatus 500. The apparatus 500 may not execute the command if the command is not defined as an object to be processed by the apparatus 500 in the version corresponding to the apparatus 500. In these cases, the apparatus 500 may transmit error information to the EMS controller 160. In these cases, information indicating the version corresponding to the EMS controller 160, or information indicating whether the contents of the command in the version corresponding to the EMS controller 160 matches the contents of the command in the version corresponding to the apparatus 500 may be obtained by an input from an operator or the like.

(Operation and Effect)

In the embodiment, the EMS controller 160 transmits, to the apparatus 500, the command including the version information indicating the version corresponding to the EMS controller 160. Therefore, it is possible to reduce the problem caused by the version corresponding to the apparatus 500 being different from the version corresponding to the EMS controller 160 (for example, improper interpretation of the meaning of the code value included in the command, or the like).

For example, in a case where the apparatus 500 is newly introduced, it is considered that the version corresponding to the apparatus 500 is newer than the version corresponding to the EMS controller 160. In such a case, if the meaning of the code value included in the command is changed, the apparatus 500 performs an operation that is not assumed by the EMS controller 160. According to the embodiment, such a problem can be reduced.

Another Embodiment

Hereinafter, another embodiment will be described below. The difference from the embodiment will be mainly described below.

In another embodiment, the EMS controller 160 transmits, to the apparatus 500, the version information indicating the version corresponding to the EMS controller 160 at a predetermined timing. The predetermined timing is at least one of timing at which the version corresponding to the EMS controller 160 is updated and a periodic timing. Alternatively, as the predetermined timing, there is an announcement (announcement upon state change) when the state of the apparatus 500 changes.

In another embodiment, since the apparatus 500 receives the version information indicating the version corresponding to the EMS controller 160 at a predetermined timing, the apparatus 500 can grasp the version defining the command to be received from the EMS controller 160 in the future. Therefore, the command may not include the version information of the EMS controller 160.

Figure 8:
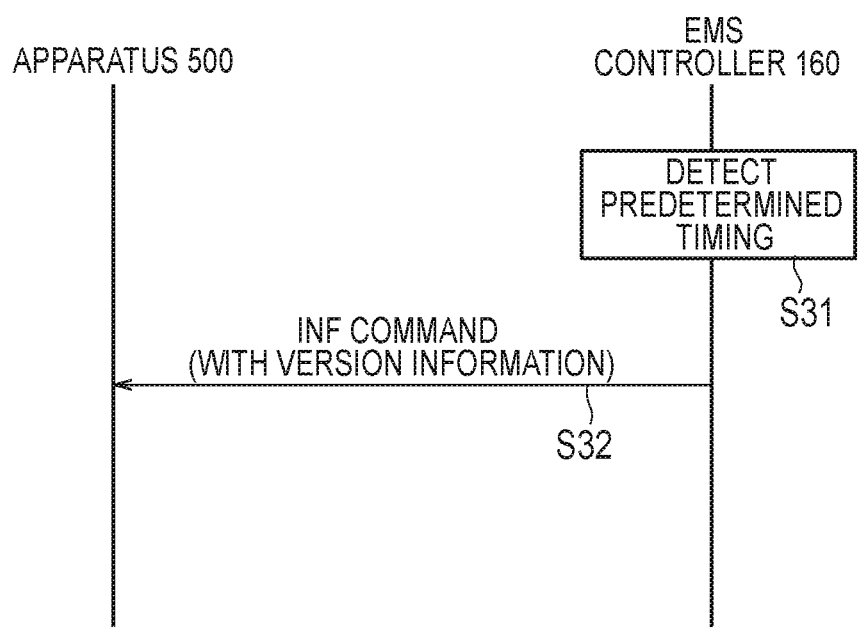
FIG. 8 is a diagram illustrating a management method according to another embodiment.

For example, as illustrated in FIG. 8, in step S31, the EMS controller 160 detects the predetermined timing. As described above, the predetermined timing is at least one of the timing at which the version corresponding to the EMS controller 160 is updated and the periodic timing.

In step S32, the EMS controller 160 transmits, to the apparatus 500, the command (here, the INF command) including the version information of the EMS controller 160.

Another Embodiment

Hereinafter, another embodiment will be described below. The difference from the embodiment will be mainly described below.

In another embodiment, the EMS controller 160 confirms whether the apparatus 500 is compatible with the version corresponding to the EMS controller 160 with respect to the apparatus 500 at a first timing. The apparatus 500 confirms whether the EMS controller 160 is compatible with the version corresponding to the apparatus 500 with respect to the EMS controller 160 at a second timing. The first timing is at least one of timing at which the version corresponding to the EMS controller 160 is updated and a periodic timing. The second timing is at least one of timing at which the version corresponding to the apparatus 500 is updated and a periodic timing.

For example, as illustrated in FIG. 9, in step S41, the EMS controller 160 detects the first timing. As described above, the first timing is at least one of the timing at which the version corresponding to the EMS controller 160 is updated and the periodic timing.

In step S42, the EMS controller 160 transmits a version confirmation request to the apparatus 500 so as to confirm whether the apparatus 500 is compatible with the version corresponding to the EMS controller 160. The version confirmation request includes, for example, the version information of the EMS controller 160.

In step S43, the apparatus 500 transmits, to the EMS controller 160, a version confirmation response indicating whether the apparatus 500 is compatible with the version corresponding to the EMS controller 160. The version confirmation response may include a list of versions with which the apparatus 500 is compatible.

Through these procedures, the EMS controller 160 can grasp whether the apparatus 500 is compatible with the version corresponding to the EMS controller 160. For example, if the command defined by the version corresponding to the apparatus 500 is managed, the EMS controller 160 transmits the command defined by the version corresponding to the apparatus 500. On the other hand, if the command defined by the version corresponding to the apparatus 500 is not managed, the EMS controller 160 acquires the command defined by the version corresponding to the apparatus 500 and transmits the command defined by the version corresponding to the apparatus 500. Thus, it is possible to suppress the transmission of the command defined by the version with which the apparatus 500 is not compatible.

In step S51, the apparatus 500 detects the second timing. As described above, the second timing is at least one of the timing at which the version corresponding to the apparatus 500 is updated and the periodic timing In step S52, the apparatus 500 transmits the version confirmation request to the EMS controller 160 so as to confirm whether the EMS controller 160 is compatible with the version corresponding to the apparatus 500. The version confirmation request includes, for example, the version information of the apparatus 500.

In step S53, the EMS controller 160 transmits, to the apparatus 500, the version confirmation response indicating whether the EMS controller 160 is compatible with the version corresponding to the apparatus 500. The version confirmation response may include a list of versions with which the EMS controller 160 is compatible.

Through these procedures, the EMS controller 160 can grasp whether the EMS controller 160 is compatible with the version corresponding to the apparatus 500. For example, if the command defined by the version corresponding to the apparatus 500 is managed, the EMS controller 160 transmits the command defined by the version corresponding to the apparatus 500. On the other hand, if the command defined by the version corresponding to the apparatus 500 is not managed, the EMS controller 160 acquires the command defined by the version corresponding to the apparatus 500 and transmits the command defined by the version corresponding to the apparatus 500. Thus, it is possible to suppress the transmission of the command defined by the version that the apparatus 500 does not support.

Another Embodiment

Hereinafter, another embodiment will be described below. The difference from the embodiment will be mainly described below.

In another embodiment, the apparatus 500 may store the version grasped by the apparatus 500 as the version corresponding to the EMS controller 160. In this case, when the apparatus 500 transmits the command defined by the stored version, the apparatus 500 can partially omit transmission of the version information. For example, when the power of the apparatus 500 is turned on, the command including the version information is first transmitted to the EMS controller 160. As long as the error is not returned from the EMS controller 160, the apparatus 500 can determine that the normal operation has been performed. Therefore, after that, the apparatus 500 can transmit the command without the version information based on the version corresponding to the EMS controller 160 stored in the apparatus 500. When the power supply of the apparatus 500 is turned off and then the power is turned on, the command including the version information is first transmitted to the EMS controller 160, and if no error is returned from the EMS controller 160, the command without the version information is then transmitted.

Other Embodiments

Although the present invention has been described with reference to the above-described embodiments, it should not be understood that the description and drawings constituting a part of this disclosure limit the present invention. From this disclosure, various alternative embodiments, examples, and operational technologies will become apparent to those skilled in the art.

The apparatus 500 may return, to the EMS controller 160, the message including the version information indicating the version corresponding to the apparatus 500 in response to the command received from the EMS controller 160. Specifically, if the version corresponding to the EMS controller 160 is the same as the version corresponding to the apparatus 500, the apparatus 500 may include the version information indicating the version corresponding to the apparatus 500 in the GET response command or the SET response command to be returned to the EMS controller 160. If not executing the command received from the EMS controller 160, the apparatus 500 may include the version information indicating the version corresponding to the apparatus 500 in error information to be returned to the EMS controller 160.

The error information may include an error factor. The cause of the error is, for example, a mismatch between the version corresponding to the EMS controller 160 and the version corresponding to the apparatus 500, a mismatch between the contents of the command in the version corresponding to the EMS controller 160 and the contents of the command in the version corresponding to the apparatus 500, an event in which the command is not defined as the object to be processed by the apparatus 500, and the like.

The version information is information (Release of Appendix of ECHONET Lite) defining an information element included in the command, but the embodiment is not limited thereto. The version information may be a corresponding authentication version of the EMS controller 160 or the apparatus 500. The version of the authentication may be the authentication stage in the case where the authentication is updated, may be the presence or absence of the authentication, may be the type of the authentication, and may be the presence or absence of the authentication for each type of the authentication. The authentication may be a third party authentication that is an authentication by a third party organization. The third party organization may be a public organization, an international standard organization, or a testing organization such as a general incorporated corporation. Examples of the authentication types include application interface framework (AIF) authentication and smart meter application (SMA) authentication.

The EMS controller 160 includes a display and may display, on the display, the version information indicating the version corresponding to the apparatus 500. For example, if the version information is received from the apparatus 500, the EMS controller 160 displays the received version information. As described above, the version information may be included in the GET response command or the SET response command returned to the EMS controller 160, or may be included in the error information returned to the EMS controller 160.

INDUSTRIAL APPLICABILITY

According to the present disclosure, it is possible to provide a management system, a management method, an apparatus, and a control device, capable of improving user convenience.

The invention claimed is:

1. A management system comprising an apparatus and a control device, wherein
the control device comprises a transmitter configured to transmit, to the apparatus, a command controlling the apparatus,
the command includes a code value associated with contents of the command, and version information indicating a version corresponding to the control device, and
the version defines an information element included in the command.

2. The management system according to claim 1, wherein the apparatus comprises a management unit configured to, even if a version corresponding to the apparatus is updated from a first version to a second version, manage the command defined by the second version and continue to manage the command defined by the first version.

3. The management system according to claim 1, wherein the apparatus is configured to transmit error information to the control device when the version information is not included in the command.

4. The management system according to claim 1, wherein the apparatus does not execute the command when the version corresponding to the control device is different from a version corresponding to the apparatus.

5. The management system according to claim 1, wherein the apparatus does not execute the command when the version corresponding to the control device is different from a version corresponding to the apparatus and contents of the command in the version corresponding to the control device are different from contents of the command in the version corresponding to the apparatus.

6. The management system according to claim 1, wherein the apparatus executes the command when the version corresponding to the control device is different from a version corresponding to the apparatus but contents of the command in the version corresponding to the control device are the same as contents of the command in the version corresponding to the apparatus.

7. The management system according to claim 1, wherein the apparatus transmits error information to the control device when the command is not executed.

8. The management system according to claim 1, wherein the apparatus transmits error information to the control device when the command is not defined as an object to be processed by the apparatus in a version corresponding to the apparatus.

9. The management system according to claim 1, wherein the apparatus executes the command if the version corresponding to the control device is the same as a version corresponding to the apparatus.

10. The management system according to claim 1, wherein
the apparatus transmits the command including the version information if power of the apparatus is turned on.

11. The management system according to claim 1, wherein
the version information indicates a version of corresponding authentication of the control device or the apparatus.

12. A management system comprising an apparatus and a control device, wherein
the control device comprises a controller configured to transmit, to the apparatus, a command in order to confirm, with respect to the apparatus at a first timing, whether the apparatus is compatible with a version corresponding to the control device,
the command including a code value associated with contents of the command, and version information indicating the version corresponding to the control device,
the apparatus comprises a controller configured to confirm, with respect to the control device at a second timing, whether the control device is compatible with a version corresponding to the apparatus, and
the version corresponding to the control device defines a meaning of the code value.

13. The management system according to claim 12, wherein
the first timing is at least one of timing at which the version corresponding to the control device is updated and a periodic timing, and
the second timing is at least one of timing at which the version corresponding to the apparatus is updated and a periodic timing.

14. A management method comprising:
transmitting a command controlling an apparatus, from a control device to the apparatus, wherein the command includes a code value associated with contents of the command, and version information indicating a version corresponding to the control device, and the version defines a meaning of the code value, wherein the method further comprises, even if the version corresponding to the apparatus is updated from a first version to a second version, managing, by the apparatus, the command defined by the second version and continuing to manage, by the apparatus, the command defined by the first version.

\* \* \* \* \*